(12) United States Patent
Ishiwa

(10) Patent No.: US 7,155,903 B2
(45) Date of Patent: Jan. 2, 2007

(54) BUFFER WASHER MEMBER AND VIBRATION AND HEAT INSULATING BOARD HAVING THE SAME

(75) Inventor: Shuichi Ishiwa, Yokohama (JP)

(73) Assignee: Nichias Corporation, Tokyo (JP)

( * ) Notice: Subject to any disclaimer, the term of this patent is extended or adjusted under 35 U.S.C. 154(b) by 160 days.

(21) Appl. No.: 10/882,347

(22) Filed: Jul. 2, 2004

(65) Prior Publication Data

US 2005/0028519 A1    Feb. 10, 2005

(30) Foreign Application Priority Data

Jul. 11, 2003    (JP)    ............... 2003-273669

(51) Int. Cl.
*F01N 7/00*    (2006.01)
*F16F 1/18*    (2006.01)
*F16B 43/00*    (2006.01)

(52) U.S. Cl. .................. 60/322; 267/160; 267/161; 267/162; 411/531; 411/540; 19/DIG. 36

(58) Field of Classification Search .................. 60/322, 60/323; 411/531; 267/160
See application file for complete search history.

(56) References Cited

U.S. PATENT DOCUMENTS 4,323,994 A * 4/1982 Coogler ...................... 367/183
5,096,166 A * 3/1992 Schwerdt ................ 267/140.12
5,134,593 A * 7/1992 Logan et al. ................ 367/187
5,522,688 A * 6/1996 Reh ............................ 411/536
5,709,516 A * 1/1998 Peterson et al. ............ 411/544
6,050,556 A * 4/2000 Masuda et al. ............. 267/161
6,155,720 A * 12/2000 Battig ......................... 384/99
6,216,833 B1 * 4/2001 Lefferts et al. ............. 188/380
6,827,536 B1 * 12/2004 Leon et al. ................... 411/61

FOREIGN PATENT DOCUMENTS

JP    56-17313    2/1981
JP    4-71733    6/1992

* cited by examiner

*Primary Examiner*—Thomas Denion
*Assistant Examiner*—Loren C. Edwards
(74) *Attorney, Agent, or Firm*—Oblon, Spivak, McClelland, Maier & Neustadt, P.C.

(57) ABSTRACT

A collar member including a main body part having a bolt hole for inserting a bolt and a flange part projecting horizontally to outside from the upper end of the main body part, a fitting member being a member for fitting with a vibration and heat insulating board main body part, having an inside diameter larger than the outside diameter of the collar member by specified dimension, and disposed at the outside of the collar member, and a spring member disposed in a specified dimension between the collar member and fitting member for coupling the collar member and fitting member at least on three positions. As a result, mounting on the vibration source is stable, the heat insulation effect and vibration control effect are high, and the cost is reduced.

3 Claims, 3 Drawing Sheets

BUFFER WASHER MEMBER AND VIBRATION AND HEAT INSULATING BOARD HAVING THE SAME

BACKGROUND OF THE INVENTION

1. Field of the Invention

The present invention relates to a buffer washer member used in a vibration and heat insulating board disposed, for example, around an exhaust manifold of an automotive engine, and a vibration and heat insulating board having the same.

2. Description of Background Art

As shown in FIG. 5, in an exhaust manifold 101 of an automotive engine 100, combustion emission of high temperature reaching several hundred degrees flows inside along with operation of the engine 100. To prevent heat and vibration generated in the exhaust manifold 101 from diffusing into the engine room or outside parts of the vehicle, a vibration and heat insulating board 102 is disposed around the exhaust manifold 101. If the vibration and heat insulating board 102 is directly coupled to the exhaust manifold 101 by means of bolts 103, heat and vibration of the exhaust manifold 101 are directly transmitted to the vibration and heat insulating board 102, and the effect of installation of the vibration and heat insulating board 102 is reduced. Accordingly, the exhaust manifold 101 and vibration and heat insulating board 102 are usually coupled by way of a buffer member not shown in the drawing.

Japanese Laid-open Utility Model No. S56-17313 discloses a heat insulating board which is prepared by disposing a wire mesh member in a mounting part on a vibration source, and coupling this wire mesh member integrally to a heat resistant metal plate. Japanese Laid-open Utility Model No. H4-71733 discloses a heat insulating board composed of inside and outside metal plates, and a heat resisting mesh interposed on substantially entire surface between these metal plates, in which the metal plates are notched around the mounting part of the heat insulating board to expose the mesh, and the exposed mesh is attached to a fixing member. In these heat insulating boards, vibration of the vibration source can be controlled, but it is not enough to shield the heat diffusion from the exhaust manifold, and mounting on the vibration source is unstable. To solve these problems, preparing two rigid members having flange members projecting from one end of sleeves horizontally to outside, the other ends of sleeves are joined to form a collar member, and a wire mesh member having a hole larger than the outside diameter of the sleeves but smaller than the outside diameter of the flange members is freely fitted in the sleeves to compose a heat insulating board. According to this heat insulating board, the collar member is firmly tightened by bolts to the specified fixing position of the vibration source, the collar member and wire mesh member are coupled in freely fitting state, and therefore the contact parts thereof are only partial and variable, so that the heat insulating effect is high.

(Patent reference 1) Japanese Laid-open Utility Model No. S56-17313 (claim 1)

(Patent reference 2) Japanese Laid-open Utility Model No. H4-71733 (claim 1)

SUMMARY OF THE INVENTION

In the heat insulating board having such high heat insulating effect, however, the collar member and wire mesh member collide against each other due to transverse vibration of the exhaust manifold, and unusual sound is generated and the wire mesh member is damaged. Besides, the collar member is a heat resistant rigid metal, and is expensive.

It is hence a primary object of the present invention to provide a buffer washer member stable in mounting on vibration source, high in heat insulating effect and vibration preventing effect, and reduced in cost, and a vibration and heat insulating board using the same.

To solve the problems of the prior arts, the present invention presents a buffer washer member used in a vibration and heat insulating board comprising a collar member including a main body part having a bolt hole for inserting a bolt and a flange part projecting horizontally to outside from the upper end of the main body part, and a spring member having one end fitted at least on three positions in the peripheral direction of the flange part of the collar member. The present invention also presents a buffer washer member used in a vibration and heat insulating board comprising a collar member including a main body part having a bolt hole for inserting a bolt and a flange part projecting horizontally to outside from the upper end of the main body part, a fitting member being a member for fitting with a vibration and heat insulating board main body part, having an inside diameter larger than the outside diameter of the collar member by specified dimension, and disposed at the outside of the collar member, and a spring member disposed in a specified dimension between the collar member and fitting member for coupling the collar member and fitting member at least on three positions. The present invention further presents a vibration and heat insulating board having such buffer washer member.

According to the buffer washer member of the present invention, the collar member uses only one of the two collar members used in the prior art, and the cost is saved. By bolting, the sleeve end of the collar member can be pressed and fixed to the mounting part of the vibration source, and even by this fixing method, fixing on the vibration source is stable. Also according to the vibration and heat insulating board of the present invention, the vibration from the vibration source is absorbed by the spring member, and the vibration control effect is high. Further, diffusion of heat from the heat source is isolated by the spring member, and the heat insulating effect is high.

DETAILED DESCRIPTION OF THE INVENTION AND PREFERRED EMBODIMENT

Figure 1:
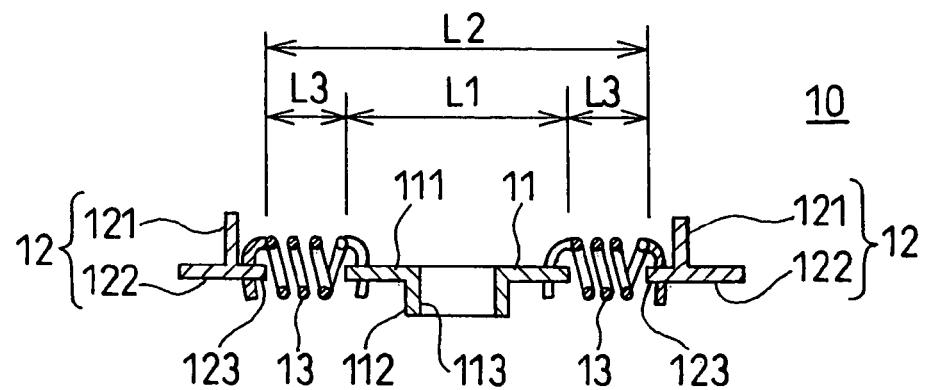
FIG. 1 is an enlarged longitudinal sectional view of buffer member in a preferred embodiment of the present invention.
Figure 2:
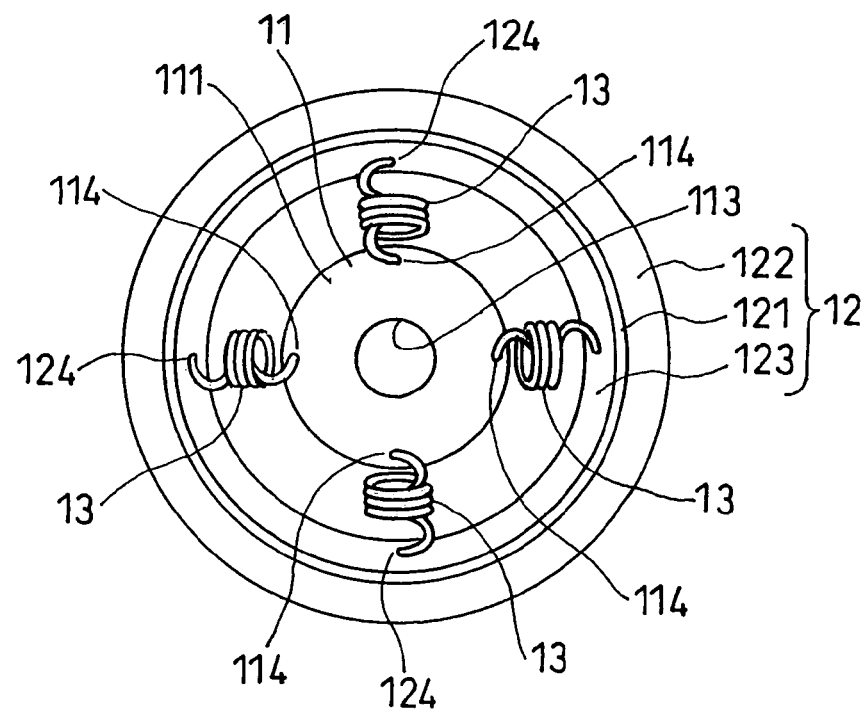
FIG. 2 is a top view of the buffer washer member of the preferred embodiment.

A buffer washer member in a preferred embodiment of the present invention is described below while referring to FIG. 1 and FIG. 2. A buffer washer member 10 comprises one collar member 11, one fitting member 12, and four spring members 13, 13, 13, 13. The number of spring members is not limited to four, but may be, for example, three.

The collar member 11 is a member fixed to a mounting part of vibration source such as exhaust manifold, and consists of a main body part 112 having a bolt hole 113 for inserting a bolt, and a flange part 111 projecting horizontally to outside from the upper end of the main body part 112. The bolt hole 113 is slightly larger than the outside diameter of the bolt, and the bolt can be inserted without resistance. The upper surface of the flange part 111 is a flat plane for abutting against the rear side of the bolt head, and mounting holes 114 to which one end of the coil spring 13 is fitted are formed at four equally divided positions in the circumferential direction. The lower end surface of the main body part 112 is a horizontal plane to be pressed and fixed to the mounting part of the vibration source.

The fitting member 12 is a member for fitting with the vibration and heat insulating board main body part, and has an inside diameter L2 larger than the outside diameter L1 of the collar member 11 by two specified dimensions L3, and disposed at the outside of the collar member 11. The fitting member 12 of the preferred embodiment consists of a flat ring member 122, and a locking piece 121 erected upright on the circumference of the top of the ring member 122. The locking piece 121 is bent outside like a flower opening its petals when mounting the buffer washer member 10 on the vibration and heat insulating board main body part, and holds the vibration and heat insulating board main body part together with the flat ring member 122. The flat ring member 122 has a mounting hole 124 for mounting other end of the coil spring 13 at opposite position of the mounting hole 114, in the inside member 123 of its locking piece 121. The shape of the fitting member 12 is not limited to the shown example, and, for example, the locking piece 121 may be erected upright on the circumference of the lower side of the ring member 122.

The spring member 13 is disposed within specified dimension L3 between the collar member 11 and fitting member 12, and the collar member 11 and fitting member 12 are coupled at least at four positions, and it is a coil spring in this example. Accordingly, after the vibration and heat insulating board is fitted to the exhaust manifold, the fitting member 12 or the vibration and heat insulating board can be supported on the collar member 11 of the fixing member by way of four coil springs, and transverse vibration and longitudinal vibration from the exhaust manifold can be absorbed by the coil springs, and heat diffusion can be isolated, and therefore both vibration control effect and heat insulation effect can be enhanced. The spring member 13 is not limited to the coil spring only as far as the same effects are obtained.

Figure 3:
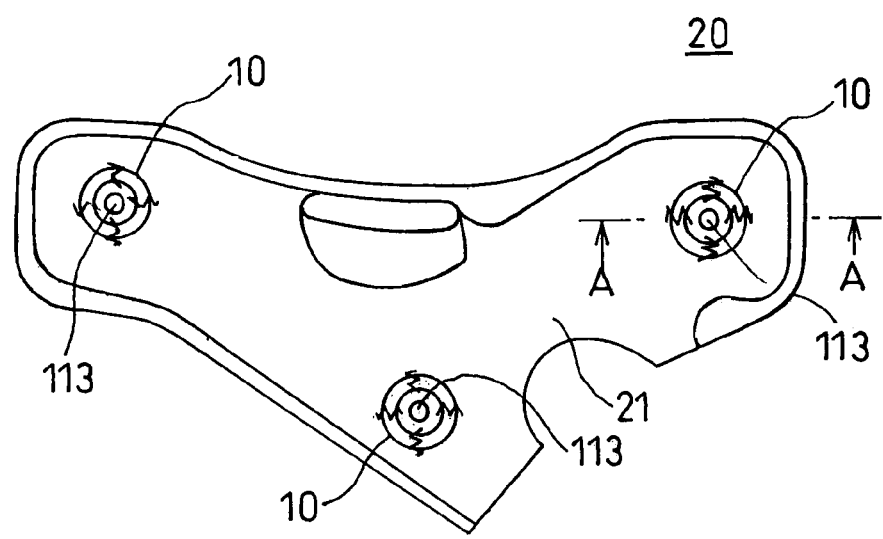
FIG. 3 is front view of vibration and heat insulating board of the preferred embodiment.
Figure 4:
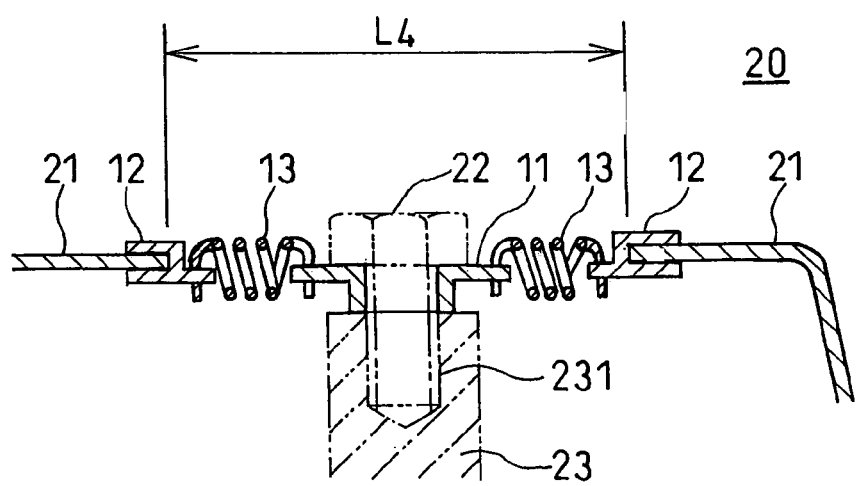
FIG. 4 is a sectional view along line A—A in FIG. 3.
Figure 5:
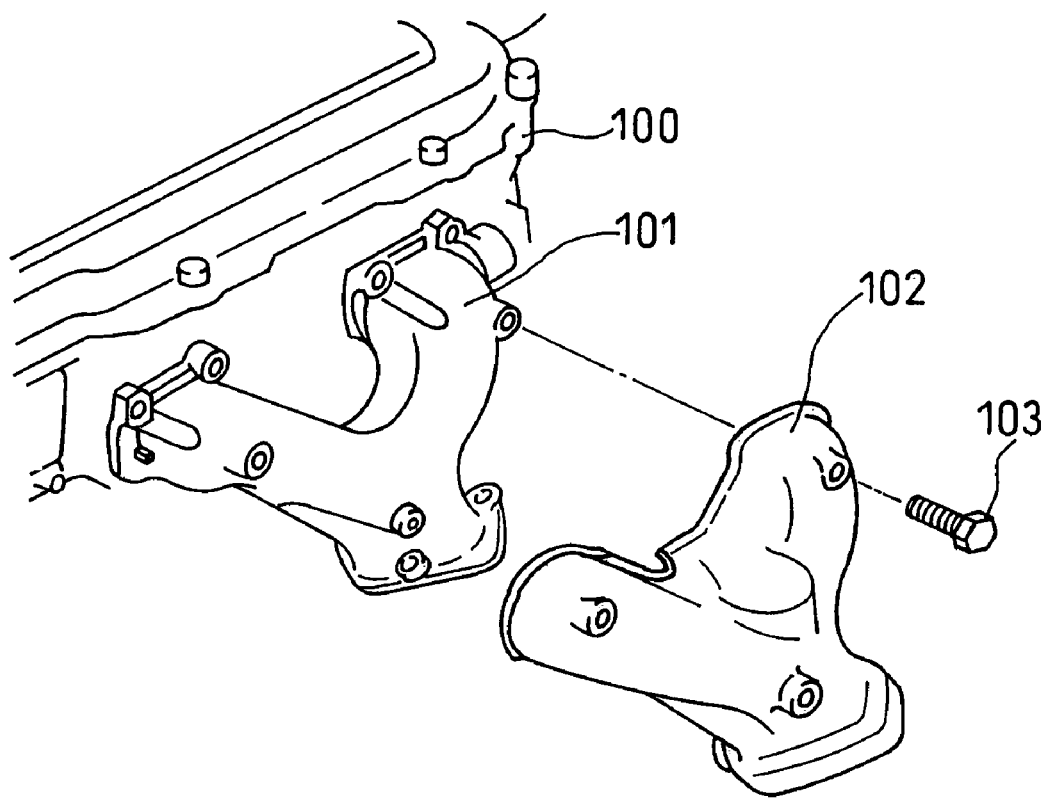
FIG. 5 is a diagram explaining a method of installation of vibration and heat insulating board and exhaust manifold in a prior art.

The vibration and heat insulating board of the preferred embodiment of the present invention is described below while referring to FIG. 3 and FIG. 4. A vibration and heat insulating board 20 is disposed, for example, around an exhaust manifold of an automotive engine, and comprises a vibration and heat insulating board main body part 21, and buffer washer members 10, 10, 10.

The vibration and heat insulating board main body part 21 is generally a heat resistant metal plate, and its shape and processing method are known. The vibration and heat insulating board main body part 21 has a hole (not shown) of diameter L4 for mounting the buffer washer members 10, 10, 10. The hole is formed at a position opposite to a mounting part 23 of the exhaust manifold when mounting the vibration and heat insulating board 20 on the exhaust manifold. The mounting part 23 of the exhaust manifold has female threads 231 to be engaged with a bolt 22.

The vibration and heat insulating board 20 fabricated by installing the buffer washer member 10 in the hole of the vibration and heat insulating board main body part 21. To install the buffer washer member 10 in the hole of the vibration and heat insulating board main body part 21, the buffer washer member 10 is fitted from the rear side of the hole of the vibration and heat insulating board main body part 21, and the vibration and heat insulating board main body part 21 is mounted on the top of the outside of the ring member 122 of the fitting member 12. In this state, the locking piece 121 is bent to outside, and the vibration and heat insulating board main body part 21 is held together with the flat ring member 122. The vibration and heat insulating board 20 having the buffer washer member 10 is fitted, for example, so as to cover the entire surface of the exhaust manifold, and tightened by bolt 22 by finely adjusting the relative positions of the bolt hole of the collar member 11 and the mounting part 23 of the exhaust manifold. A washer may be used when tightening the bolt 22.

According to the vibration and heat insulating board 20 of the preferred embodiment, since the collar member used only one collar member out of two collar members used in the prior art, and hence the cost is saved. The vibration and heat insulating board 20 is mounted on the exhaust manifold by pressing and fixing the lower end of the sleeve of the collar member to the mounting part of the vibration source, and fixing is stable. Transverse vibration and longitudinal vibration from the exhaust manifold are absorbed by four coil springs 13, and the vibration control effect is high. In particular, in spite of transverse vibration, the vibration and heat insulating board main body part 21 does not contact with the collar member 11, and unusual sound or damage will not take place. Further, diffusion of heat from the heat source is isolated by the spring member, and the heat insulation effect is also high.

In the buffer washer member 10 of the preferred embodiment, the fitting member 12 may be omitted. That is, without using the fitting member 12 of the buffer washer member 10, the other end of the coil spring 13 can be directly fitted to the vibration and heat insulating board main body part 21. In this case, an engaging hole for mounting the other end of the coil spring 13 is formed in the vibration and heat insulating board main body part 21, and the other end of the coil spring 13 may be fitted into this engaging hole. As a result, aside from the same effects as in the foregoing preferred embodiment, the number of components can be further reduced, and the cost reduction is attained. At the same time, the manufacturing process becomes easier.

What is claimed is:

1. A vibration and heat insulating board comprising:

a buffer washer member including, a collar member including a main body part having a bolt hole for inserting a bolt and a flange part projecting horizontally to outside from the upper end of the main body part;

a spring member having one end fitted at least on three positions in the peripheral direction of the flange part of the collar member; and a fitting member configured to fit with a vibration and heat insulating board main body part, the fitting member having an inside diameter larger than the outside diameter of the collar member by a predetermined amount, and disposed at the outside of the collar member, wherein the collar member and fitting member are coupled together by means of the spring member, and wherein the vibration and heat insulating board is disposed around an exhaust manifold of an automotive engine.

2. The vibration and heat insulating board according to claim 1, wherein the spring member is a coil spring.

3. The vibration and heat insulating board according to claim 1, wherein the fitting member is composed of a ring-shaped horizontal member, and a vertical member erected upright on the top of the ring-shaped horizontal member.

* * * * *